(12) United States Patent
Uehara et al.

(10) Patent No.: US 7,072,682 B2
(45) Date of Patent: Jul. 4, 2006

(54) COMMUNICATION TERMINAL APPARATUS, BASE STATION APPARATUS AND COMMUNICATION METHOD

(75) Inventors: Toshiyuki Uehara, Yokosuka (JP); Kenichi Miyoshi, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 674 days.

(21) Appl. No.: 10/203,103

(22) PCT Filed: Dec. 27, 2001

(86) PCT No.: PCT/JP01/11522

§ 371 (c)(1),
(2), (4) Date: Aug. 6, 2002

(87) PCT Pub. No.: WO02/052883

PCT Pub. Date: Jul. 4, 2002

(65) Prior Publication Data

US 2003/0036385 A1 Feb. 20, 2003

(30) Foreign Application Priority Data

Dec. 27, 2000 (JP) ........................................ 2000-399440

(51) Int. Cl.
*H04B 7/00* (2006.01)
*H04Q 7/20* (2006.01)

(52) U.S. Cl. ..................... 455/525; 455/522; 455/434; 455/435.1; 455/436; 455/67.11

(58) Field of Classification Search ................. 455/525, 455/522, 437, 434, 435.1, 435.2, 435.3, 436, 455/438, 439, 67.11, 67.12, 67.13, 67.14
See application file for complete search history.

(56) References Cited

U.S. PATENT DOCUMENTS 5,594,949 A  1/1997  Andersson et al.

(Continued)

FOREIGN PATENT DOCUMENTS

JP  08125602  5/1996

(Continued)

OTHER PUBLICATIONS

Supplementary European Search Report dated Jun. 3, 2003.

(Continued)

*Primary Examiner*—Nick Corsaro
*Assistant Examiner*—Shaima Q. Aminzay
(74) *Attorney, Agent, or Firm*—Stevens, Davis, Miller & Moshner, LLP

(57) ABSTRACT

Complex correlation section 110 complex-multiplies baseband signals obtained by frequency-converting known signals sent from base station apparatuses, which are candidate communication partners, to baseband frequencies by known patterns to distinguish signals of the respective base station apparatuses, despreads the baseband signals and obtains amplitude values. Desired signal power measuring section 111 averages the amplitude values with a predetermined number of symbols, interference signal power measuring section 112 that calculates a desired signal power value by suppressing the interference component separates the interference component by subtracting the desired signal power value from the amplitude values. Division section 113 divides the desired signal by the interference signal, calculates a CIR value and outputs the CIR value to transmission sections 102-1 to 102-n. Transmission sections 102-1 to 102-n carry out processing necessary for radio transmission such as modulation, coding and frequency conversion, etc. and send the signal via antenna 103.

5 Claims, 9 Drawing Sheets

U.S. PATENT DOCUMENTS

| | | | |
|---|---|---|---|
| 6,160,999 A | 12/2000 | Chheda et al. | |
| 6,205,129 B1 * | 3/2001 | Esteves et al. | 370/331 |
| 6,233,454 B1 * | 5/2001 | Sato | 455/437 |
| 6,414,947 B1 * | 7/2002 | Legg et al. | 370/331 |
| 6,574,473 B1 * | 6/2003 | Rinne et al. | 455/436 |

FOREIGN PATENT DOCUMENTS

| | | |
|---|---|---|
| JP | 09084103 | 3/1997 |
| JP | 11146443 | 5/1999 |
| JP | 11298946 | 10/1999 |
| JP | 2000151639 | 5/2000 |
| JP | 2001057528 | 2/2001 |
| WO | 9633589 | 10/1996 |
| WO | 9931918 | 6/1999 |

OTHER PUBLICATIONS

A. Morimoto, et al.; "Independent Fast Transmit Power Control for each Cell Site in W–CDMA Forward Link Inter–cell Site Diversity", Technical Report of IEICE, RCS 2000–164, Nov. 2000, pp. 1–7, English abstract.

* cited by examiner

COMMUNICATION TERMINAL APPARATUS, BASE STATION APPARATUS AND COMMUNICATION METHOD

TECHNICAL FIELD

The present invention relates to a communication terminal apparatus, base station apparatus and communication method, and more particularly, to a communication terminal apparatus, base station apparatus and communication method suitable for CDMA (Code Division Multiple Access) communications.

BACKGROUND ART

In a conventional mobile communication system using a CDMA system, FCS (Fast Cell Selection) is one of systems whereby a communication terminal apparatus selects one base station apparatus from among a plurality of base station apparatuses to communicate. According to FCS, a communication terminal apparatus compares the reception quality of known signals sent from a plurality of base station apparatuses and communicates with a base station apparatus, which has sent a known signal of the best reception quality.

For example, when a communication terminal apparatus changes a base station with which to communicate by measuring the reception quality of known signals and selecting a base station apparatus which has sent a known signal of the highest quality, the communication terminal apparatus formally sends a connection request to the base station apparatus which has sent a known signal of the highest reception quality.

Then, the base station apparatus decides radio resource assignment and a communication method from the reception quality information of the known signal sent from the communication terminal apparatus and enters into communication with the communication terminal apparatus. The communication method here refers to settings of signals to be sent by the base station apparatus such as a modulation scheme of signals to be sent, coding rate, spreading factor in a CDMA communication and number of multicodes.

However, in the case of a conventional apparatus, a communication terminal apparatus sends reception quality information of a known signal sent from a base station apparatus, which is the communication partner, to this base station apparatus, whereas the communication terminal apparatus does not send reception quality information of known signals sent from base station apparatuses with which it is not communicating to these base station apparatuses. Then, when the communication terminal apparatus changes the base station apparatus with which to communicate, the communication terminal apparatus sends the reception quality of a known signal of a base station apparatus with which the communication terminal apparatus desires to have a new communication to this base station apparatus.

In a conventional apparatus, when there are variations in a propagation path due to fast fading, etc., even if the communication terminal apparatus measures reception quality information of a known signal and sends the information, the situation of the propagation path is likely to have changed drastically when the base station apparatus uses the information and the base station decides radio resource assignment and a communication method based on the reception quality information and may fail to set sufficient conditions to carry out a communication, causing the communication terminal apparatus to fail to correctly receive a signal sent by the base station apparatus immediately after the transmission.

DISCLOSURE OF INVENTION

It is an object of the present invention to provide a communication terminal apparatus, base station apparatus and communication method capable of speedily decide appropriate radio resource assignment and a communication method in a communication between the base station apparatus and communication terminal apparatus.

This object is attained by the communication terminal apparatus sending reception quality information of a known signal to not only the base station apparatus with which it is communicating but also a plurality of base station apparatuses with which the communication terminal apparatus is likely to communicate, by the base station apparatus storing reception quality information of communication terminal apparatuses other than the communication terminal apparatus with which it is communicating and deciding, upon receipt of a connection request from the communication terminal, radio resource assignment and a data rate from the stored reception quality information, or by the communication terminal apparatus storing reception quality information of known signals of not only the base station apparatus with which it is communicating but also a plurality of base station apparatuses with which the communication terminal apparatus is likely to communicate and sending the stored reception quality information to the base station apparatus to which a connection request is sent when the communication terminal apparatus changes the base station apparatus with which to communicate and by the base station apparatus requested for a connection receiving the stored reception quality information and deciding radio resource assignment and a communication method.

BEST MODE FOR CARRYING OUT THE INVENTION

With reference now to the attached drawings, embodiments of the present invention will be explained below.

(Embodiment 1)

According to Embodiment 1 of the present invention, a communication terminal apparatus receives known signals sent from a plurality of base station apparatuses and sends the reception quality information of the known signals to the respective base station apparatuses, while a base station apparatus stores and averages this reception quality information and decides, upon receipt of a connection request from the communication terminal, radio resources (e.g., slot, frequency band, code or transmission power) to be assigned to the communication terminal apparatus, data rate (e.g., modulation scheme, coding rate, spreading factor or number of multicodes) and enters into communication with the communication terminal apparatus.

Then, a configuration of the communication terminal apparatus according to Embodiment 1 of the present invention will be explained.

Figure 1:
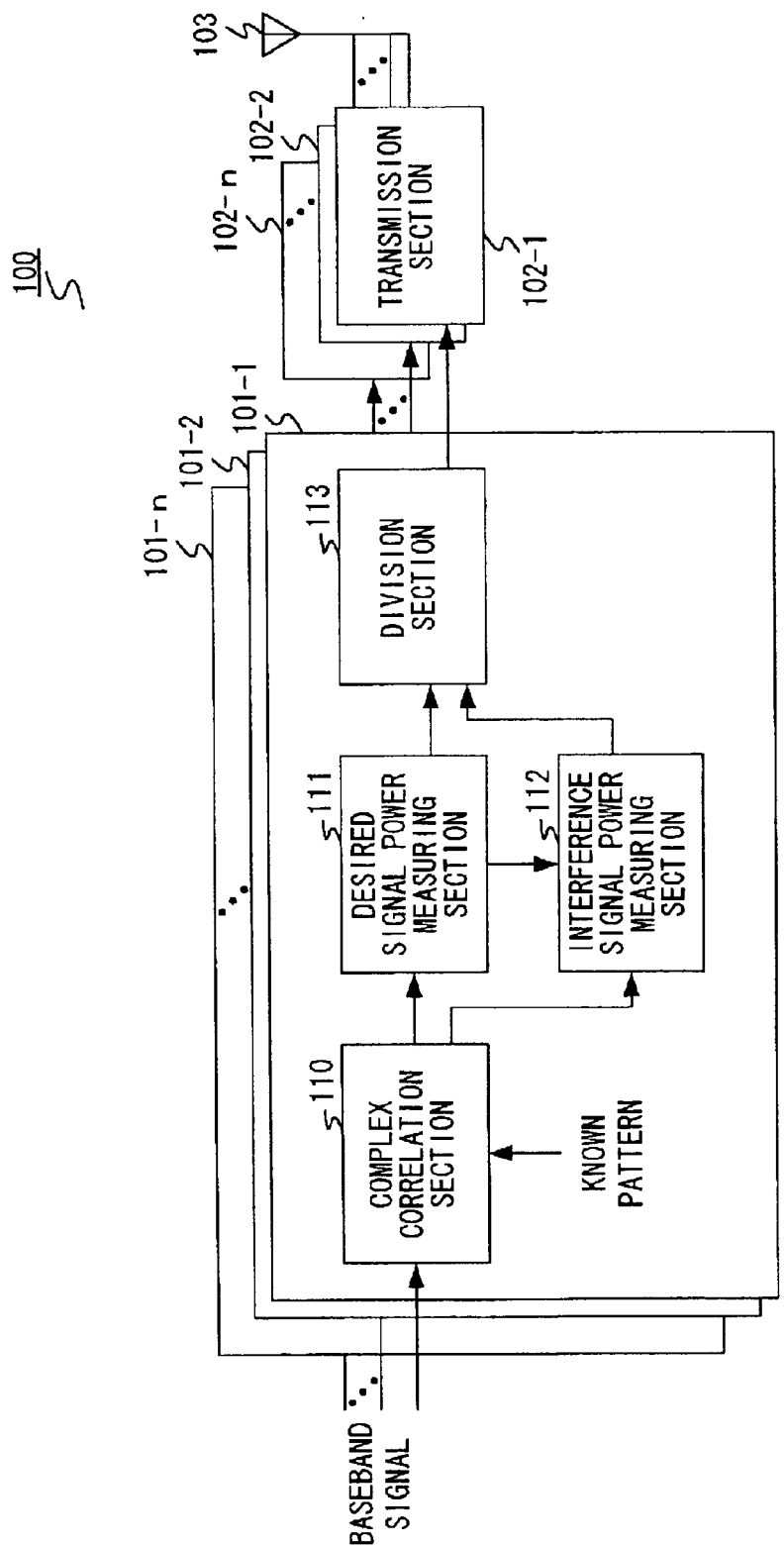
FIG. 1 is a block diagram showing a configuration of a communication terminal apparatus according to Embodiment 1 of the present invention.

FIG. 1 is a block diagram showing a configuration of the communication terminal apparatus according to Embodiment 1 of the present invention.

In FIG. 1, communication terminal apparatus 100 is mainly constructed of a plurality of CIR calculation sections 101-1 to 101-n, a plurality of transmission sections 102-1 to 102-n and antenna 103. CIR calculation sections 101-1 to 101-n are mainly constructed of complex correlation section 110, desired signal power measuring section 111, interference signal power measuring section 112 and division section 113.

Complex correlation section 110 complex-multiplies a baseband signal obtained by converting a known signal sent from a base station apparatus, which is a candidate communication partner, to a baseband frequency by a known pattern to distinguish signals from different base station apparatuses, to obtain an amplitude value and outputs the amplitude value to desired signal power measuring section 111 and interference signal power measuring section 112.

Desired signal power measuring section 111 averages the amplitude value with a predetermined number of symbols and calculates a desired signal power value. Desired signal power measuring section 111 then outputs the desired signal power value to interference signal power measuring section 112 and division section 113.

Interference signal power measuring section 112 subtracts the amplitude value obtained from the desired signal power value from the received amplitude value to calculate an interference signal power value and outputs the interference signal power value to division section 113. Division section 113 divides the desired signal power value by the interference signal power value to calculate a CIR value and outputs the CIR value to transmission section 102-1.

Thus, CIR calculation sections 101-1 to 101-n calculate CIR values of known signals sent from the respective base station apparatuses and output the CIR values to transmission sections 102-1 to 102-n. Transmission sections 102-1 to 102-n carry out processing necessary for radio transmission such as coding, modulation and frequency conversion on the CIR value information and sends the resulting information via antenna 103.

Figure 2:
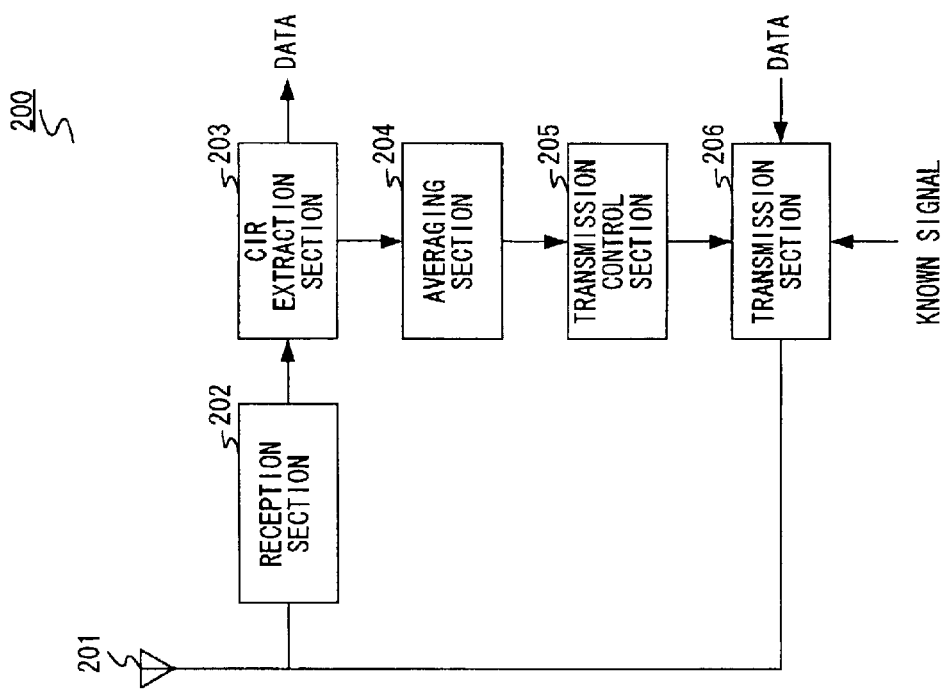
FIG. 2 is a block diagram showing a configuration of a base station apparatus according to the above-described embodiment.

Then, a configuration of the base station apparatus according to Embodiment 1 of the present invention will be explained. FIG. 2 is a block diagram showing a configuration of a base station apparatus according to Embodiment 1 of the present invention. In FIG. 2, base station apparatus 200 is mainly constructed of antenna 201, reception section 202, CIR extraction section 203, averaging section 204, transmission control section 205 and transmission section 206.

Reception section 202 receives a radio signal sent from the communication terminal apparatus via antenna 201, carries out processing necessary to obtain data such as conversion to a baseband frequency, demodulation and decoding and outputs the received signal obtained to CIR extraction section 203. CIR extraction section 203 extracts CIR information corresponding to the known signal sent by the own station from the received signal and outputs the extracted CIR information to averaging section 204. Averaging section 204 averages the CIR information by a predetermined time unit and outputs to transmission control section 205.

Transmission control section 205 decides radio resource assignment and a data rate (e.g., modulation scheme, coding rate, spreading factor or number of multicodes) from the averaged CIR information. Transmission section 206 transmits data according to the communication method output from transmission control section 205 via antenna 201. Furthermore, transmission section 206 transmits a known signal via antenna 201.

Figure 3:
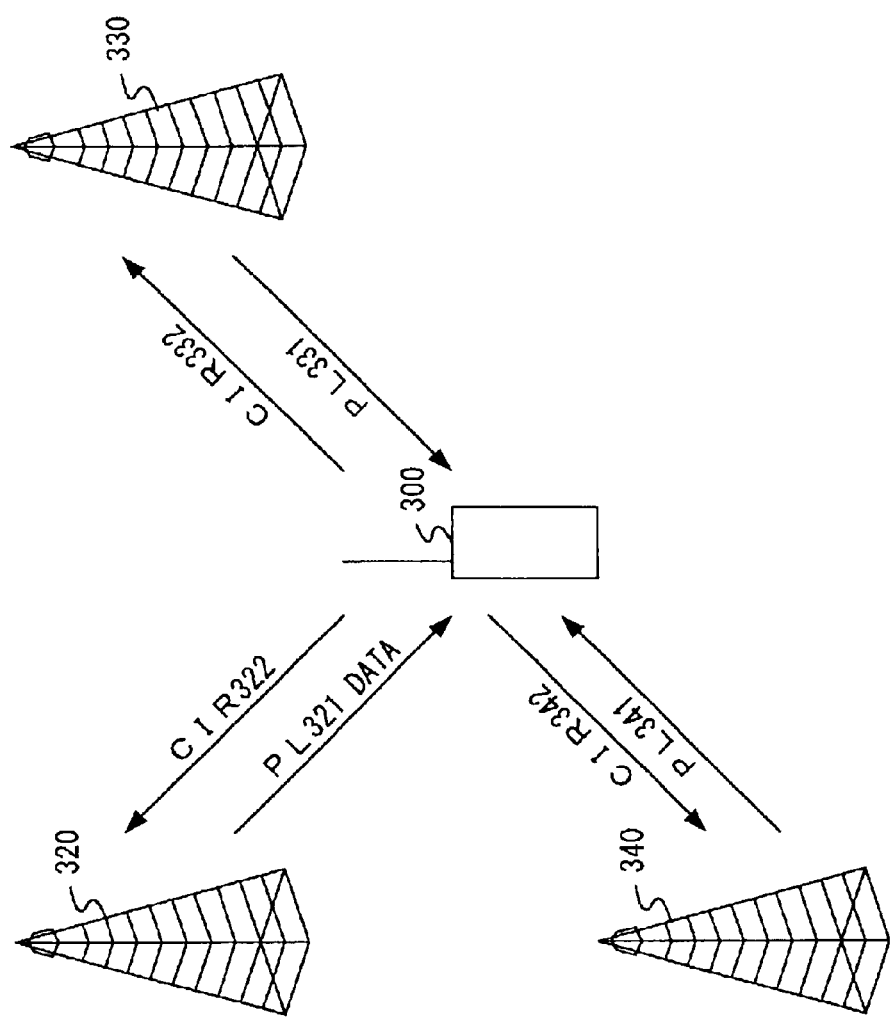
FIG. 3 illustrates exchange of communication signals between the base station apparatus and communication terminal apparatus according to the above-described embodiment.

Then, signal exchange between the base station apparatus and communication terminal apparatus. FIG. 3 illustrates exchange of communication signals between the base station apparatus and communication terminal apparatus according to Embodiment 1 of the present invention. Communication terminal apparatus 300 is mainly constructed of above-described communication terminal apparatus 100. On the other hand, base station apparatuses 320, 330 and 340 are mainly constructed of above-described base station apparatus 200.

In FIG. 3, communication terminal apparatus 300 calculates a signal to interference ratio (hereinafter referred to as "CIR") of a known signal PL321 received from base station apparatus 320, a candidate communication partner, and transmits CIR322 calculated to base station apparatus 320. Furthermore, communication terminal apparatus 300 calculates a CIR value of known signal PL331 received from base station apparatus 330, a candidate communication partner, and transmits CIR332 calculated to base station apparatus 330. Furthermore, communication terminal apparatus 300 calculates a CIR value of known signal PL341 received from base station apparatus 340, a candidate communication partner, and transmits CIR342 calculated to base station apparatus 340.

When communication terminal apparatus 300 starts to communicate with base station apparatus 320, communication terminal apparatus 300 receives known signal PL321 sent from base station apparatus 320 selected as a communication partner and sends CIR322 which is reception quality information of received known signal PL321 to base station apparatus 320. Base station apparatus 320 decides from CIR322, radio resources to be assigned to communication terminal apparatus 300 or data rate of signals to be transmitted, for example, modulation scheme, coding rate, spreading factor in a CDMA communication system or number of multicodes, etc. and sends the data to the communication terminal apparatus.

Furthermore, when starting to communicate with base station apparatus 320, communication terminal apparatus 300 receives known signal PL331 of base station apparatus 330 with which no communication is started yet and sends CIR332, which is the reception quality information of known signal PL331 to base station apparatus 330. Likewise, communication terminal apparatus 300 sends CIR342, which is the reception quality information of known signal PL341 to base station apparatus 340.

When communication terminal apparatus 300 changes the communication partner to be selected from base station apparatus 320 to base station apparatus 330, base station apparatus 330 receives a communication request from communication terminal apparatus 300 and then decides from CIR information sent from communication terminal apparatus 300 in the past, radio resources to be assigned to the communication terminal apparatus 300 or data rate of signals to be transmitted, for example, modulation scheme, coding rate, spreading factor in a CDMA communication system or number of multicodes, etc. and sends data to communication terminal apparatus 300.

Figure 4:
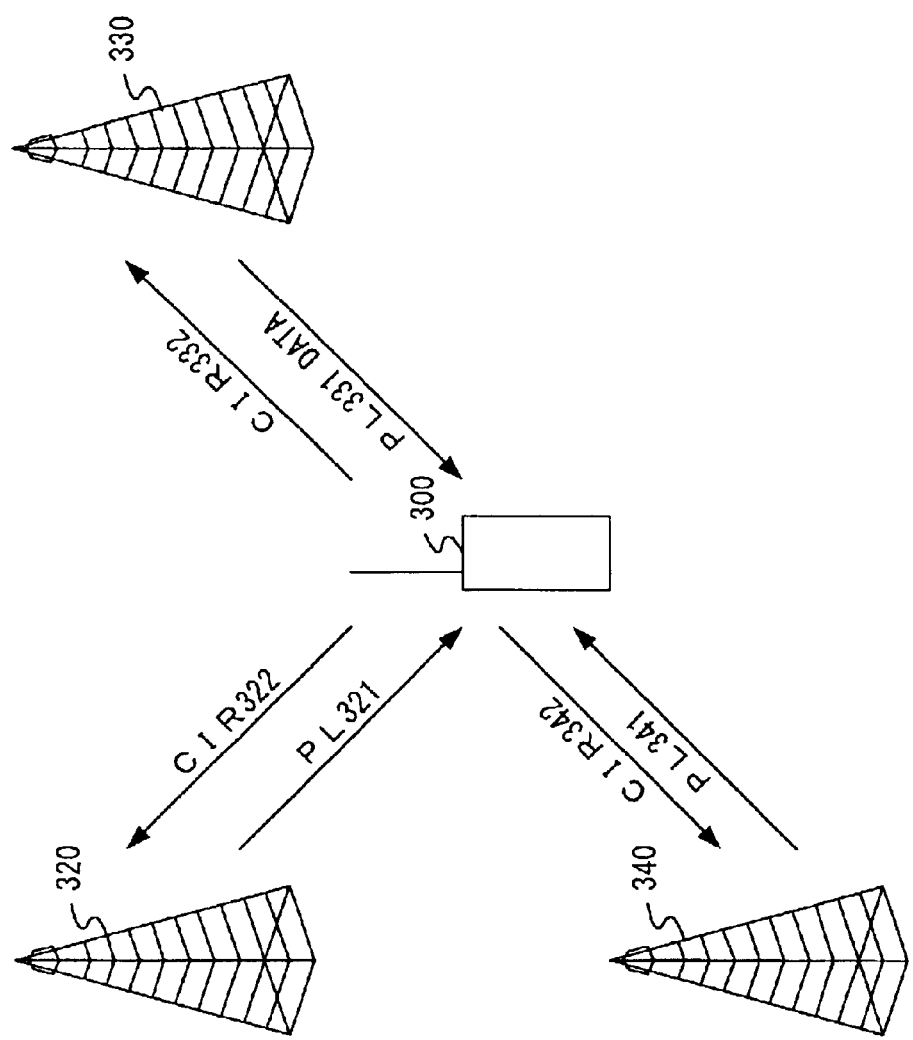
FIG. 4 illustrates exchange of communication signals between the communication terminal apparatus and base station apparatus after the communication terminal apparatus has changed the base station apparatus with which to communicate.

FIG. 4 illustrates exchange of communication signals between the communication terminal apparatus and base station apparatus after the communication terminal apparatus has changed the base station apparatus with which to communicate. In FIG. 4, communication terminal apparatus 300 starts to communicate with base station apparatus 330 and continues to send reception quality information CIR 322 and CIR342 of known signals PL321 and PL341 of base station apparatus 320 and base station apparatus 340 respectively even after receipt of the data from base station apparatus 330.

Thus, according to the communication terminal apparatus and base station apparatus of this embodiment, the communication terminal apparatus receives known signals sent from a plurality of base station apparatuses, sends reception quality information of known signals to the respective base station apparatuses that sent the known signals, and when the communication terminal apparatus changes the base station apparatus with which to actually communicate, the base station apparatus can decide from the reception quality information of the known signals sent beforehand, radio resource assignment and a data rate, and this embodiment can thereby speedily decide appropriate radio resource assignment and data rate and enter into a communication in a communication between the base station apparatus and communication terminal apparatus.

(Embodiment 2)

A communication terminal apparatus according to Embodiment 2 of the present invention measures reception quality information of known signals corresponding to a plurality of base station apparatuses with which the communication terminal apparatus is likely to communicate other than the base station apparatus with which it is actually communicating and supplies, when changing the base station apparatus as the communication partner, reception quality information measured in the past to base station apparatuses with which the communication terminal apparatus desires to establish a communication, while the base station apparatus decides from the reception quality information sent from the communication terminal apparatus, radio resources and a data rate and enters into communication with the communication terminal apparatus.

Figure 5:
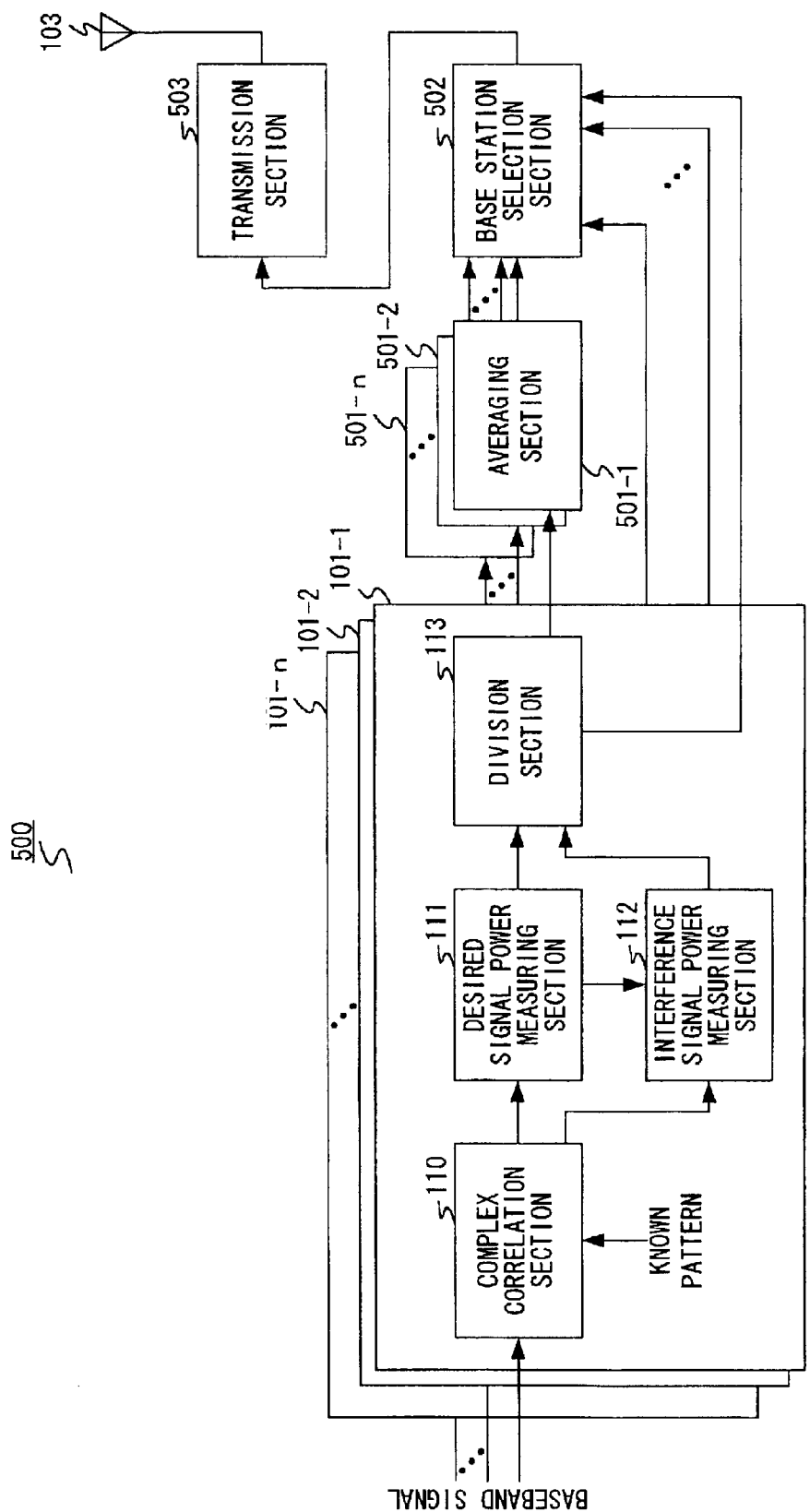
FIG. 5 is a block diagram showing a configuration of a communication terminal apparatus according to Embodiment 2 of the present invention.

FIG. 5 is a block diagram showing a configuration of a communication terminal apparatus according to Embodiment 2 of the present invention. However, the same components as those in FIG. 1 are assigned the same reference numerals as those in FIG. 1 and detailed explanations thereof will be omitted.

Communication terminal apparatus 500 in FIG. 5 differs from the communication terminal apparatus according to Embodiment 1 in that communication terminal apparatus 500 is provided with averaging sections 501-1 to 501-n, base station apparatus selection section 502 and transmission section 503 and that communication terminal apparatus 500 averages reception quality information of known signals, selects reception quality information of a known signal sent from the base station apparatus with which communication terminal apparatus 500 desires to communicate and sends the reception quality information to the base station apparatus.

CIR calculation sections 101-1 to 101-n calculate CIR values of known signals sent from the respective base station apparatuses, which are candidate communication partners and output the CIR values to averaging sections 501-1 to 501-n and base station selection section 502.

Averaging sections 501-1 to 501-n average the CIR values of the known signals by a predetermined time unit and output the averaged CIR value to base station selection section 502. Base station selection section 502 compares the CIR values output from CIR calculation sections 101-1 to 101-n, selects a base station apparatus with the best CIR value and outputs the information to be sent to the selected base station apparatus and the averaged CIR value information corresponding to the selected base station to transmission section 503.

Transmission section 503 carries out processing necessary for radio transmission such as modulation, coding and frequency conversion on a transmission signal, which consists of the selected CIR information and a request for connection with the selected base station apparatus and sends the transmission signal via antenna 103.

Figure 6:
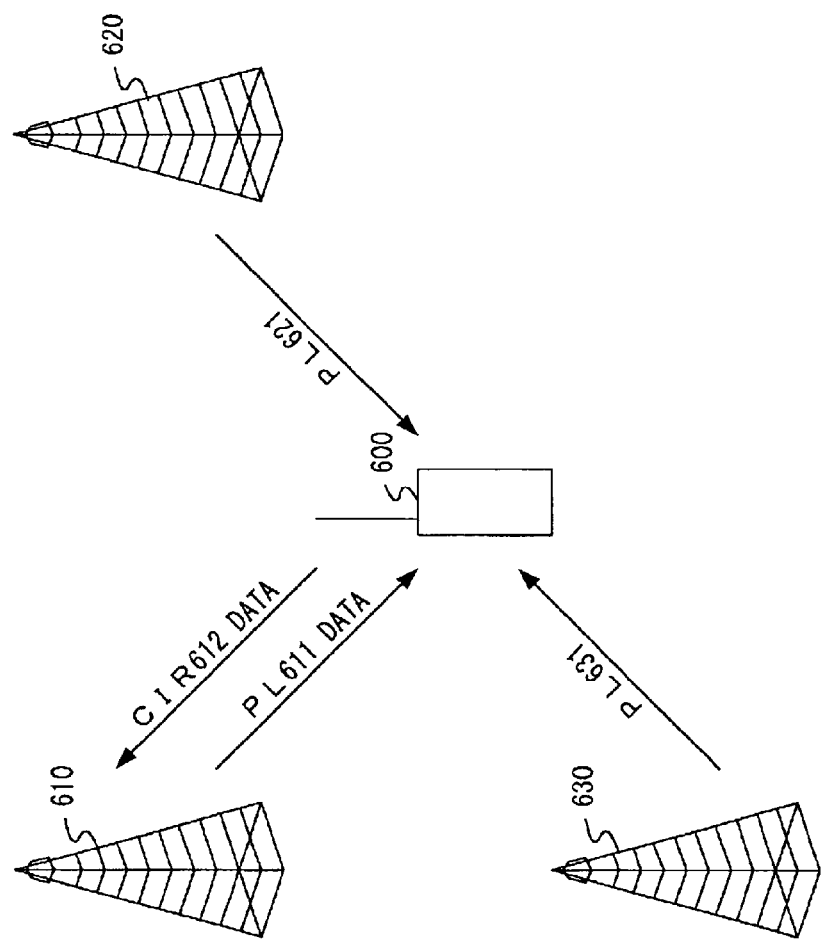
FIG. 6 illustrates exchange of communication signals between the base station apparatus and communication terminal apparatus according to the above-described embodiment.

Then, signal exchange between the base station apparatus and communication terminal apparatus will be explained. FIG. 6 illustrates exchange of communication signals between the base station apparatus and communication terminal apparatus according to Embodiment 2 of the present invention. Communication terminal apparatus 600 is mainly constructed of aforementioned communication terminal apparatus 500. On the other hand, base station apparatuses 610, 620 and 630 are the base station apparatuses that decide from the CIR value sent from communication terminal apparatus 600, radio resources to be assigned to communication terminal apparatus 600 or a data rate of the signal to be sent and sends the data to communication terminal apparatus 600.

In FIG. 6, communication terminal apparatus 600 calculates a CIR value of known signal PL611 received from base station apparatus 610 and calculates an average value of the CIR value. Furthermore, communication terminal apparatus 600 calculates a CIR value of known signal PL621 received from base station apparatus 620 and calculates an average value of the CIR value. Furthermore, communication terminal apparatus 600 calculates a CIR value of known signal PL631 received from base station apparatus 630 and calculates an average value of the CIR value.

When communication terminal apparatus 600 starts to communicate with base station apparatus 610, communication terminal apparatus 600 sends CIR612, which is the average value of the CIR of known signal PL611 to base station apparatus 610. Base station apparatus 610 decides from CIR612, radio resources to be assigned to communication terminal apparatus 600 or a data rate of signals to be transmitted, for example, modulation scheme, coding rate, spreading factor in a CDMA communication system or number of multicodes, etc. and sends the data to the communication terminal apparatus.

Furthermore, when starting to communicate with base station apparatus 610, communication terminal apparatus 600 calculates a CIR value of known signal PL621 received from base station apparatus 620 and calculates an average value of the CIR value. Furthermore, communication terminal apparatus 600 calculates a CIR value of known signal PL631 received from base station apparatus 630 and calculates an average value of the CIR value.

When communication terminal apparatus 600 changes the communication partner from base station apparatus 610 to base station apparatus 620, communication terminal apparatus 600 sends a communication request and CIR value to base station apparatus 620.

After receiving the communication request, base station apparatus 620 decides from the averaged CIR information sent from communication terminal apparatus 600, radio resources to be assigned to the communication terminal apparatus 600 or a data rate of signals to be transmitted, for example, modulation scheme, coding rate, spreading factor in a CDMA communication system or number of multicodes, etc. and sends the data to communication terminal apparatus 600.

Figure 7:
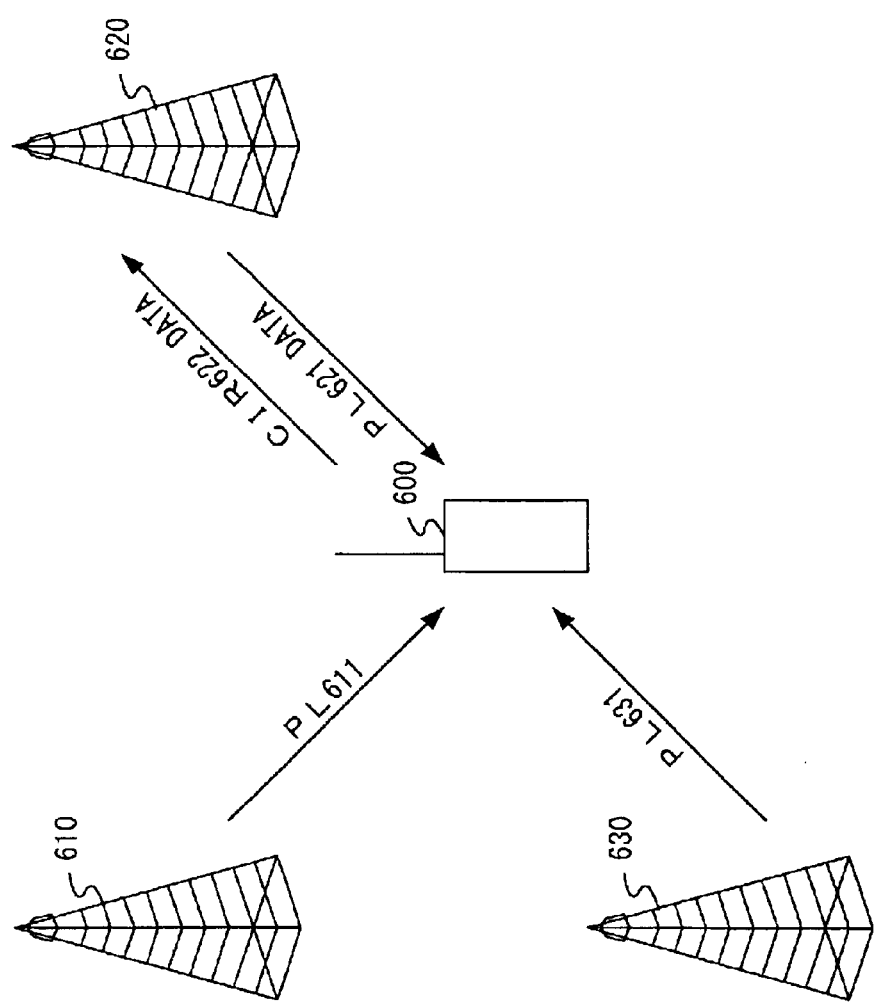
FIG. 7 illustrates exchange of communication signals between the communication terminal apparatus and base station apparatus after the communication terminal apparatus has changed the base station apparatus with which to communicate.

FIG. 7 illustrates exchange of communication signals between the communication terminal apparatus and base station apparatus after the communication terminal apparatus has changed the base station apparatus with which to communicate. In FIG. 7, communication terminal apparatus 600 sends CIR 622 to base station apparatus 620 and base station apparatus 620 decides from CIR622, radio resource assignment and a communication method and transmits/receives the data to/from communication terminal apparatus 600. Even after starting to communicate with base station apparatus 620, communication terminal apparatus 600 calculates an average value of reception quality information of known signals PL611 and PL631.

Thus, according to the communication terminal apparatus and base station apparatus of this embodiment, the communication terminal apparatus receives known signals sent from a plurality of base station apparatuses, calculates an average value of reception quality information, sends, when changing the base station apparatus with which to actually communicate, the calculated average value to the base station apparatus, and the base station apparatus can decide radio resource assignment and a transmission system, and this embodiment can thereby speedily decide appropriate radio resource assignment and a transmission system and enter into a communication in a communication between the base station apparatus and communication terminal apparatus.

Furthermore, according to the communication terminal apparatus and base station apparatus of this embodiment, the communication terminal apparatus calculates an average value of reception quality information, eliminates the need for the base station apparatus to calculate an average value of reception quality information, and can thereby simplify the configuration of the base station apparatus.

By the way, the method for averaging is not limited to a particular one and it is also possible to use an averaging method using a forgetting factor.

Furthermore, this embodiment averages reception quality information of known signals, but it is also possible to store and send the reception quality information or use already stored reception quality information using any method other than the averaging method.

(Embodiment 3)

A base station apparatus according to Embodiment 3 of the present invention instructs parameters related to averaging of reception quality information calculated by a communication terminal apparatus (e.g., averaging time) and the communication terminal apparatus measures beforehand reception quality information of known signals also for a plurality of base station apparatuses with which the communication terminal apparatus is likely to communicate, calculates an average value of the reception quality information according to the instructions from the base station apparatuses and provide, when changing the base station apparatus as the communication partner, the averaged reception quality information to a base station apparatus with which the communication terminal apparatus desires to communicate.

Figure 8:
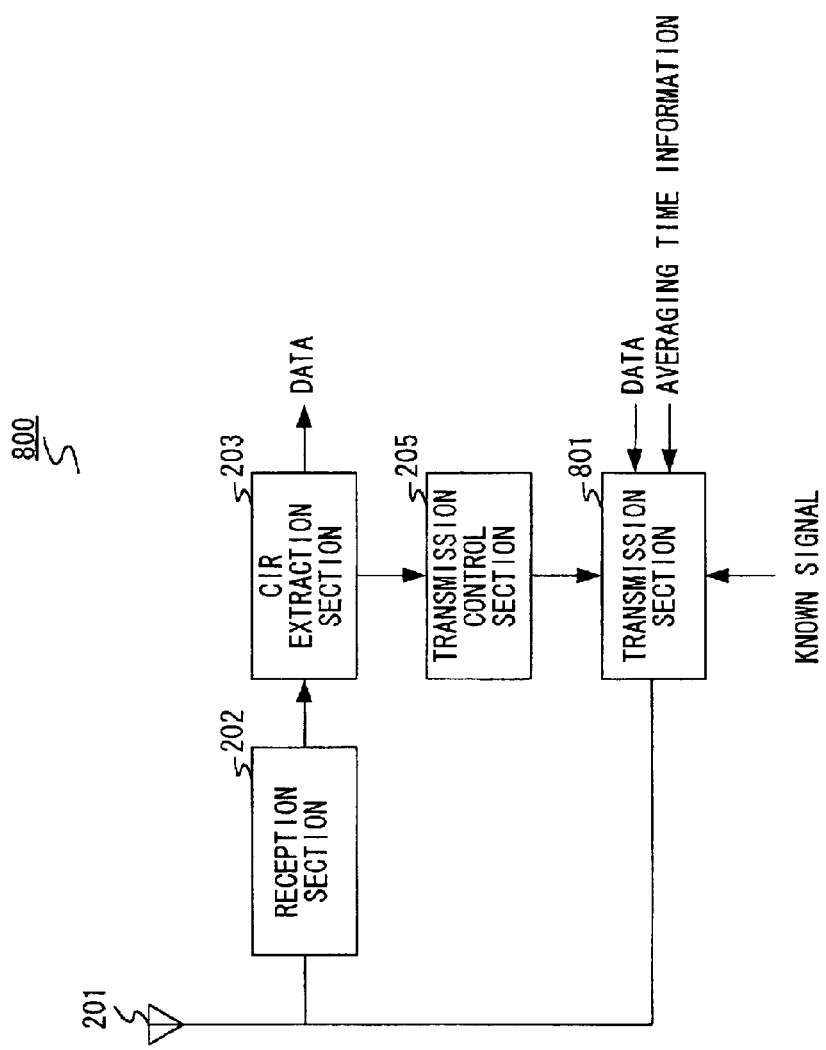
FIG. 8 is a block diagram showing a configuration of a base station apparatus according to Embodiment 3 of the present invention.

FIG. 8 is a block diagram showing a configuration of a base station apparatus according to Embodiment 3 of the present invention. However, the same components as those in FIG. 2 are assigned the same reference numerals as those in FIG. 2 and detailed explanations thereof will be omitted. Base station apparatus 800 in FIG. 8 is different from the base station apparatus according to Embodiment 2 in that it is provided with transmission section 801 and sends an instruction for averaging reception quality information of known signals to a communication terminal apparatus.

Transmission control section 205 decides radio resource assignment and a data rate (e.g., modulation scheme, coding rate, spreading factor or number of multicodes) from CIR information output from CIR extraction section 203.

Transmission section 801 sends data via antenna 201 according to a communication method output from transmission control section 205. Furthermore, transmission section 801 sends known signals via antenna 201. Furthermore, transmission section 801 sends an instruction of information on the time for averaging CIR values of known signals to be sent.

Figure 9:
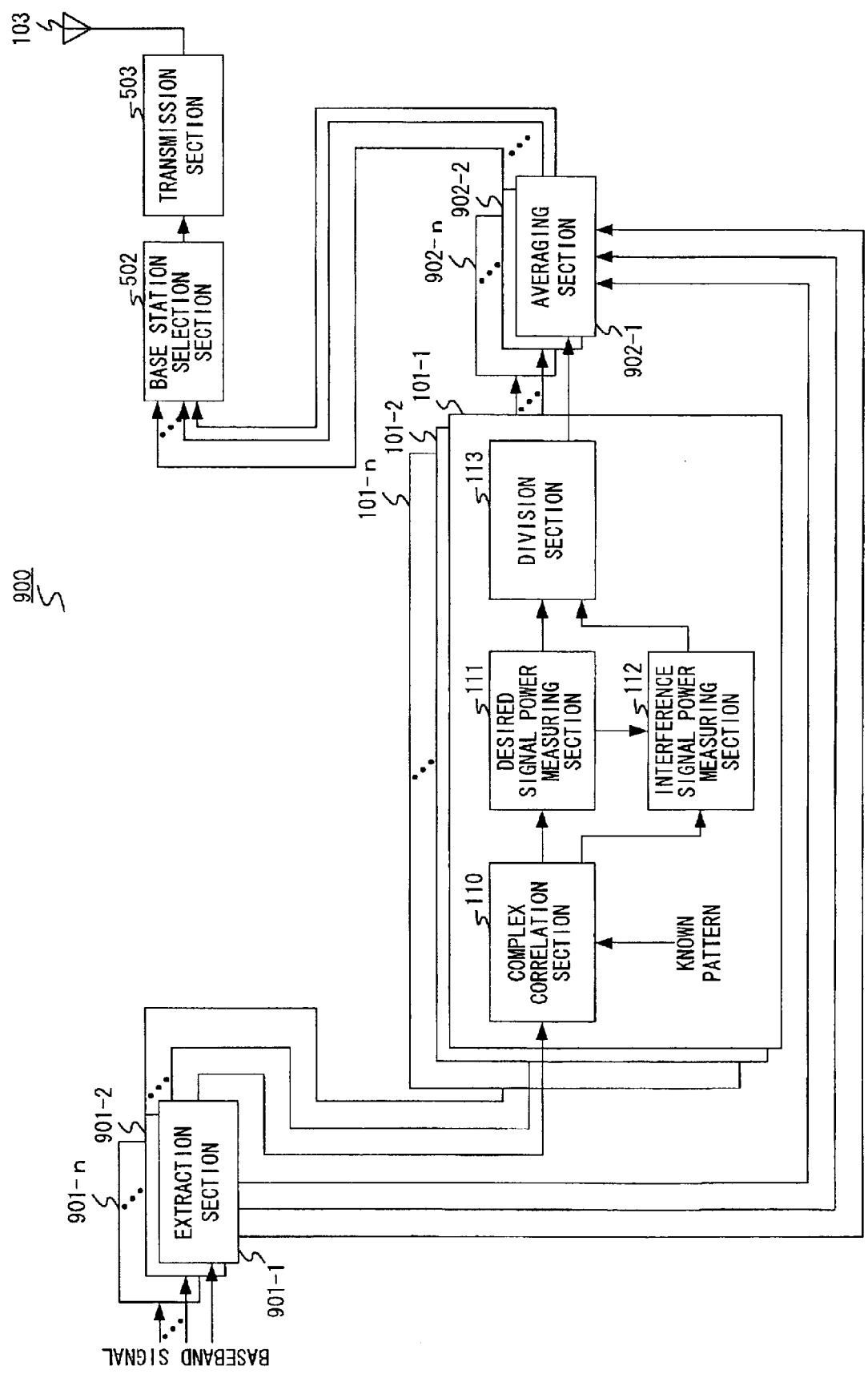
FIG. 9 is a block diagram showing a configuration of a communication terminal apparatus according to the above-described embodiment.

FIG. 9 is a block diagram showing a configuration of a communication terminal apparatus according to Embodiment 3 of the present invention. However, the same components as those in FIG. 1 are assigned the same reference numerals as those in FIG. 1 and detailed explanations thereof will be omitted. Communication terminal apparatus 900 in FIG. 9 is different from the base station apparatus according to Embodiment 2 in that it is provided with extraction sections 901-1 to 901-n and averaging sections 902-1 to 902-n and reception quality information of known signals is averaged according to averaging instructions sent from the base station apparatuses.

Extraction sections 901-1 to 901-n extract averaging instructions from baseband signals which is received signals frequency-converted to baseband frequencies and output to respective averaging sections 902-1 to 902-n. Furthermore, extraction sections 901-1 to 901-n output the baseband signals to CIR calculation sections 101-1 to 101-n.

Averaging sections 902-1 to 902-n average the CIR values of known signals by the instructed averaging times output from extraction sections 901-1 to 901-n and output to base station selection section 502.

Thus, according to the communication terminal apparatus and base station apparatus of this embodiment, the base station apparatus instructs parameters related to averaging of reception quality information (e.g., averaging time) and the communication terminal apparatus calculates an average value of the reception quality information according to the instruction from the base station apparatus, and when the communication terminal apparatus is likely to communicate with a plurality of base station apparatuses in different propagation environments, this embodiment can average the reception quality information of known signals according to the propagation environment and speedily decide appropriate radio resource assignment and communication method to carry out a communication between the base station apparatus and communication terminal apparatus.

For example, when the base station apparatus communicates with communication terminal apparatuses with different moving speeds, during averaging of the reception quality information of known signals, the averaging time necessary to decide appropriate radio resource assignment and communication method varies, but by sending an appropriate averaging time to each communication terminal apparatus, it is possible to set the time for averaging the reception quality information of known signals for each communication terminal apparatus.

The communication terminal apparatus of the present invention measures a CIR value of a known signal and sends the measured CIR value to the base station apparatus, and the base station apparatus decides radio resource assignment and a communication method from this CIR value, but not only a CIR value but also any information can be used if it is information at least indicating the reception quality of a known signal. For example, information indicating an SIR (Signal to Interference Ratio) value or a transmittable rate can also be used.

The foregoing embodiments average CIR, but the present invention is also applicable to a method using a past CIR instead of averaging.

Furthermore, the radio resource assignment and communication method which are decided by the base station apparatus from the reception quality information of known signals are not limited to the modulation scheme of signals to be sent, coding rate, spreading factor in a CDMA communication and number of multicodes, but can be any communication method that can be decided by the base station apparatus.

Furthermore, the base station apparatus of the present invention can also predict a variation of the reception quality on the mobile station side from a difference between the received reception quality information and the reception quality information received just before the last reception quality information and assign radio resources and data rate. Furthermore, the base station apparatus of the present invention can predict a tendency of variation of the reception quality using a plurality of reception quality information pieces to assign radio resources and a data rate.

On the other hand, the mobile station apparatus of the present invention stores reception quality information, calculate a difference between the current reception quality information and the reception quality information just before the current reception quality information and performs transmission to the base station apparatus. The base station apparatus can also predict a variation of the reception quality from the difference in the reception quality information sent from the mobile station apparatus and assign radio resources and a data rate. The base station apparatus can also predict a tendency of variation of the reception quality using a plurality of reception quality information to predict the reception quality on the mobile station side to assign radio resources and a data rate.

As is apparent from the above-described explanations, according to the communication terminal apparatus, base station apparatus and communication method of the present invention, the communication terminal apparatus receives known signals sent from a plurality of base station apparatuses and sends reception quality information of known signals to the respective base station apparatuses which sent the known signals, and therefore when the communication terminal apparatus changes the base station apparatus, which becomes the actual communication partner, the present invention allows the base station apparatus to speedily decide appropriate radio resource assignment and data rate to communicate with the communication terminal apparatus.

This application is based on the Japanese Patent Application No.2000-399440 filed on Dec. 27, 2000, entire content of which is expressly incorporated by reference herein.

Industrial Applicability

The present invention is ideally applicable to a communication terminal apparatus and base station apparatus that carry out CDMA (Code Division Multiple Access) communications.

What is claimed is:

1. A base station apparatus for use in a radio communication system, in which a communication terminal apparatus selects a communication partner from one of a plurality of base station apparatuses that may be possible communication partners, based on reception qualities of known signals from the plurality of base station apparatuses, and in which the base station apparatus decides, upon a connection request from the communication terminal apparatus, a radio resource assignment and communication method for use in communication with the communication terminal apparatus, based on information representing the reception quality of the known signal transmitted by the base station apparatus, the base station apparatus comprising:
 a transmitter that transmits a known signal;
 an averager that averages the information representing the reception quality, transmitted from the communication terminal apparatus, based on the known signal; and
 a decider that decides, upon the connection request from the communication terminal apparatus, the radio resource assignment and communication method for use in communication with the communication terminal apparatus, based on the averaged information representing the reception quality.

2. A communication terminal apparatus comprising:
 a reception quality measurer that measures reception qualities of known signals from the plurality of base station apparatuses of possible communication partners in claim 1;
 a transmitter that transmits information representing the reception qualities of the known signals to the plurality of base station apparatuses; and
 a selector that selects one of the plurality of base station apparatuses to be an actual communication partner based on the reception qualities and issues a connection request to the selected base station apparatus.

3. A communication terminal apparatus for use in a radio communication system, in which the communication terminal apparatus selects a communication partner from one of a plurality of base station apparatuses that may be possible communication partners, based on reception qualities of known signals from the plurality of base station apparatuses, and in which a selected base station apparatus decides, upon a connection request from the communication terminal apparatus, a radio resource assignment and communication method for use in communication with the communication terminal apparatus, based on information representing the reception quality of the known signal transmitted by the selected base station apparatus, the communication terminal apparatus comprising:
 a reception quality measurer that measures the reception qualities of the known signals from the plurality of base station apparatuses, on a per base station apparatus basis;
 an averager that averages the measured reception qualities of the known signals, on a per base station apparatus basis;

a selector that selects a base station apparatus to be the actual communication partner from the plurality of base station apparatuses and issues the connection request to the selected base station apparatus; and a transmitter that transmits to the selected base station apparatus the respective averaged information representing the reception quality of the known signal transmitted by the selected base station apparatus.

4. A communication method comprising:

at a communication terminal apparatus:

measuring reception qualities of known signals from a plurality of base station apparatuses that may be possible communication partners;

selecting a base station apparatus to be an actual communication partner from the plurality of base station apparatuses based on the measured reception qualities of the known signals;

issuing a connection request to the selected base station apparatus; and transmitting, to each of the plurality of base station apparatuses, information representing the respective measured reception quality for the base station apparatus; and at the selected base station apparatus:

averaging the information, provided by the communication terminal apparatus, representing the measured reception quality; and deciding, upon the connection request from the communication terminal apparatus, a radio resource assignment and communication method for use in communication with the communication terminal apparatus based on the averaged information representing the measured reception quality.

5. A communication method comprising:

at a communication terminal apparatus:

measuring reception qualities of known signals from a plurality of base station apparatuses that may be possible communication partners;

averaging, for each of the base station apparatuses, the measured reception quality of the respective known signal;

selecting a base station apparatus to be an actual communication partner from the plurality of base station apparatuses based on the measured reception qualities of the known signals; and issuing a connection request and transmitting the respective averaged information representing the measured reception quality to the selected base station apparatus; and at the selected base station apparatus:

deciding, upon receiving the connection request from the communication terminal apparatus, a radio resource assignment and communication method for use in communication with the communication terminal apparatus based on the transmitted averaged information representing the measured reception quality.

* * * * *